(12) United States Patent
Hashimoto

(10) Patent No.: US 12,508,970 B2
(45) Date of Patent: Dec. 30, 2025

(54) SELF-PROPELLED ROBOT AND ARTICLE DELIVERY SYSTEM PROVIDED WITH THE SELF-PROPELLED ROBOT

(71) Applicant: KAWASAKI JUKOGYO KABUSHIKI KAISHA, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 420 days.

(21) Appl. No.: 18/033,894

(22) PCT Filed: Oct. 29, 2021

(86) PCT No.: PCT/JP2021/040009
§ 371 (c)(1),
(2) Date: Apr. 26, 2023

(87) PCT Pub. No.: WO2022/092262
PCT Pub. Date: May 5, 2022

(65) Prior Publication Data
US 2023/0398922 A1 Dec. 14, 2023

(30) Foreign Application Priority Data
Oct. 30, 2020 (JP) .................................. 2020-183081

(51) Int. Cl.
*B60P 1/48* (2006.01)
*B60P 3/00* (2006.01)
(Continued)

(52) U.S. Cl.
CPC .............. *B60P 1/483* (2013.01); *B60P 3/007* (2013.01); *B64U 10/14* (2023.01); *B64U 10/20* (2023.01);
(Continued)

(58) Field of Classification Search
CPC . B25J 9/008; B25J 5/007; B60P 3/007; B60P 1/483
See application file for complete search history.

(56) References Cited

U.S. PATENT DOCUMENTS

2014/0188323 A1* 7/2014 Kouno ................. G05D 1/0242
901/1
2014/0254896 A1 9/2014 Zhou et al.
(Continued)

FOREIGN PATENT DOCUMENTS

| CN | 108436882 A | 8/2018 |
|---|---|---|
| CN | 110434824 A | 11/2019 |

(Continued)

*Primary Examiner* — Kaitlin S Joerger
(74) *Attorney, Agent, or Firm* — Oliff PLC

(57) ABSTRACT

A self-propelled robot includes a travel cart, a base part provided to an upper part of the travel cart and swivelable on a first rotation axis extending vertically, and a pair of robotic arms coupled to the base part at base-end parts, respectively. Each of the pair of robotic arms has a first link and a second link coupled at a base-end part to a tip-end part of the first link via a joint part. Base-end parts of the pair of first links are coupled to the base part so that the base-end parts are coaxially pivotable on a second rotation axis extending horizontally, and the base-end parts oppose to each other via the base part. The base-end parts of the pair of second links are coupled to side parts of the tip-end parts of the corresponding first links, on the opposing sides of the pair of first links.

6 Claims, 11 Drawing Sheets

(51) Int. Cl.
*B64U 10/14* (2023.01)
*B64U 10/20* (2023.01)
*B64U 101/60* (2023.01)
*B64U 101/64* (2023.01)

(52) U.S. Cl.
CPC ...... *B64U 2101/60* (2023.01); *B64U 2101/64* (2023.01)

(56) References Cited

U.S. PATENT DOCUMENTS

| | | | | |
|---|---|---|---|---|
| 2014/0316564 A1* | 10/2014 | Nakamura | ............ | G05B 19/19 901/1 |
| 2015/0120127 A1 | 4/2015 | Shikina et al. | | |
| 2016/0089775 A1* | 3/2016 | Yamazaki | ............ | B25J 9/0009 901/19 |
| 2017/0001305 A1* | 1/2017 | Kogan | .................... | B25J 9/162 |
| 2018/0057263 A1* | 3/2018 | Beer | ................ | B25J 15/0616 |
| 2018/0222064 A1* | 8/2018 | Nishi | ...................... | B25J 5/007 |
| 2020/0164510 A1* | 5/2020 | Gong | .................... | B25J 9/1633 |
| 2020/0189102 A1 | 6/2020 | Sasajima | | |
| 2021/0339393 A1* | 11/2021 | Dan | ........................ | B25J 5/007 |
| 2022/0153305 A1* | 5/2022 | Barckmann | ....... | B60W 60/0025 |
| 2023/0059095 A1* | 2/2023 | Tanaami | ................ | B25J 13/085 |
| 2023/0150112 A1* | 5/2023 | Morioka | ................. | B25J 5/007 180/6.48 |
| 2023/0271541 A1* | 8/2023 | Lavoie | .................... | B60P 1/483 254/84 |
| 2023/0312137 A1* | 10/2023 | Hashimoto | .............. | B64D 9/00 414/467 |
| 2023/0391451 A1* | 12/2023 | Hashimoto | .......... | G06Q 10/083 |
| 2023/0405830 A1* | 12/2023 | Hashimoto | ............ | B25J 13/065 |
| 2024/0058960 A1* | 2/2024 | Verma | .................... | B25J 9/1643 |
| 2024/0075615 A1* | 3/2024 | Verma | .................... | B25J 5/007 |
| 2024/0166444 A1* | 5/2024 | Beach | ...................... | B25J 5/007 |
| 2024/0190001 A1* | 6/2024 | Fujioka | ................... | B25J 9/163 |
| 2025/0229412 A1* | 7/2025 | Li | ........................... | B25J 5/007 |

FOREIGN PATENT DOCUMENTS

| | | |
|---|---|---|
| EP | 2 792 456 A2 | 10/2014 |
| JP | S62-054685 A | 3/1987 |
| JP | H01-175187 U | 12/1989 |
| JP | H06-271285 A | 9/1994 |
| JP | H07-328963 A | 12/1995 |
| JP | 2005-334998 A | 12/2005 |
| JP | 2007-118177 A | 5/2007 |
| JP | 2015-087960 A | 5/2015 |
| JP | 2018-111180 A | 7/2018 |
| JP | 2020-097101 A | 6/2020 |
| JP | 2020-131377 A | 8/2020 |
| LU | 101572 A1 | 1/2020 |
| WO | 2019/196753 A1 | 10/2019 |

* cited by examiner

SELF-PROPELLED ROBOT AND ARTICLE DELIVERY SYSTEM PROVIDED WITH THE SELF-PROPELLED ROBOT

CROSS-REFERENCE TO RELATED APPLICATIONS

This is a U.S. National Phase of International Application No. PCT/JP2021/040009 filed Oct. 29, 2021, which claims the benefit of Japanese Application No. 2020-183081 filed Oct. 30, 2020. The disclosure of the prior applications is hereby incorporated by reference herein in its entirety.

TECHNICAL FIELD

The present disclosure relates to a self-propelled robot and an article delivery system provided with the self-propelled robot.

BACKGROUND ART

Conventionally, self-propelled robots provided with a travel cart and a pair of robotic arms provided on the travel cart are known. Such a self-propelled robot is proposed in a robot system of Patent Document 1, for example.

The robot system of Patent Document 1 includes a travel cart and a robot provided to an upper part of a body part of the travel cart. The robot includes a base part, a first arm, a first hand provided to a tip-end part of the first arm, a second arm, and a second hand provided to a tip-end part of the second arm. The first and second arms are connected to the base part at their base-end parts. The first and second arms are arms with multiple degrees of freedom provided with a plurality of joint parts and link parts of which operation is controlled by servo motors. The robot system of Patent Document 1 moves so that it approaches a work station by using the travel cart, and the robot performs a work.

REFERENCE DOCUMENT OF CONVENTIONAL ART

Patent Document

[Patent Document 1] JP2015-087960A

DESCRIPTION OF THE DISCLOSURE

Problem to be Solved by the Disclosure

According to Patent Document 1, it is possible to perform a work in which an article loaded onto the body part of the travel cart is conveyed to the work station by using the pair of robotic arms. Here, in Patent Document 1, base-end parts of the first links of the pair of robotic arms provided to the most base-end side are coupled to the base part. However, according to Patent Document 1, it is difficult to convey an article which is small as compared with a distance between the pair of first links.

Therefore, one purpose of the present disclosure is to provide a self-propelled robot and an article delivery system provided with the self-propelled robot, capable of easily conveying an article, even if the article is small as compared with a distance between first links of a pair of robotic arms provided to the most base-end side.

SUMMARY OF THE DISCLOSURE

In order to solve the above-described problem, a self-propelled robot according to one aspect of the present disclosure includes a travel cart, a base part provided to an upper part of the travel cart and swivelable on a first rotation axis extending vertically, and a pair of robotic arms coupled to the base part at base-end parts, respectively. Each of the pair of robotic arms has a first link and a second link coupled at a base-end part to a tip-end part of the first link via a joint part. Base-end parts of the pair of first links are coupled to the base part so that the base-end parts are coaxially pivotable on a second rotation axis extending horizontally, and the base-end parts oppose to each other via the base part. The base-end parts of the pair of second links are coupled to side parts of the tip-end parts of the corresponding first links, on the opposing sides of the pair of first links.

Effect of the Disclosure

According to the present disclosure, the base-end parts of the pair of second links are coupled to the side parts of the tip-end parts of the corresponding first links, on the opposing sides of the pair of first links. Therefore, it is possible to provide the self-propelled robot and the article delivery system provided with the self-propelled robot, capable of easily conveying an article, even if the article is small as compared with a distance between the first links of the pair of robotic arms provided to the most base-end side.

MODES FOR CARRYING OUT THE DISCLOSURE

Figure 1:
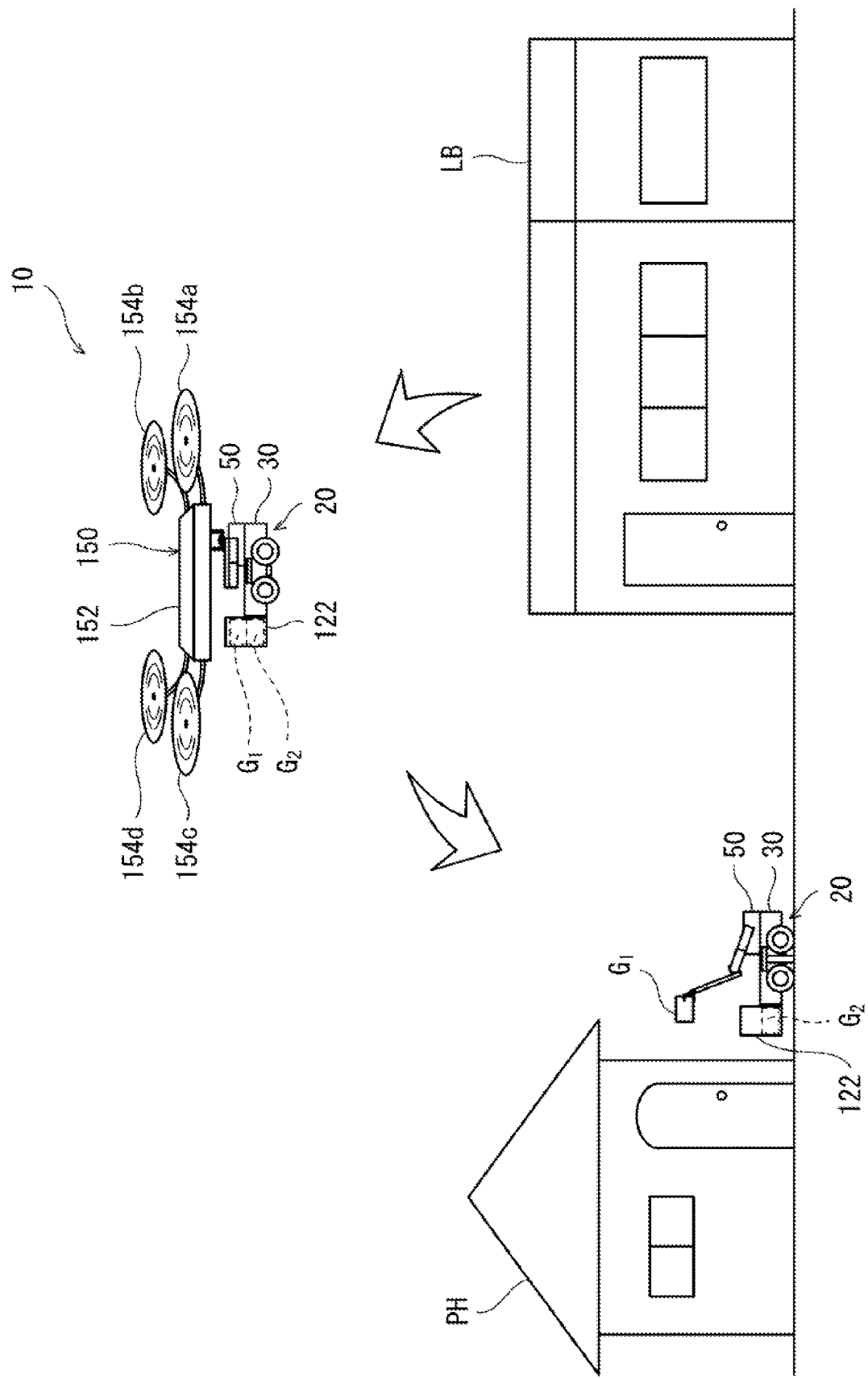
FIG. 1 is a schematic view illustrating the entire configuration of an article delivery system according to one embodiment of the present disclosure.

Hereinafter, a self-propelled robot and an article delivery system provided with the self-propelled robot according to one embodiment of the present disclosure are described with reference to the drawings. Note that the present disclosure is not limited by the present disclosure. Further, below, throughout the drawings, the same reference characters are assigned to the same or corresponding elements to omit redundant explanation.

(Article Delivery System 10)

FIG. 1 is a schematic view illustrating the entire configuration of an article delivery system according to one embodiment of the present disclosure. As illustrated in FIG. 1, an article delivery system 10 includes a self-propelled robot 20, and a VTOL aircraft (Vertical Take-Off and Landing aircraft) 150 as an unmanned aerial vehicle (UAV) in which the self-propelled robot 20 is attachable to the underneath thereof. The article delivery system 10 is used in order to automate a delivery process in a last section (a so-called "last one mile") from a logistics base LB to a personal house PH which is a destination of the delivery.

As illustrated in FIG. 1, in the article delivery system 10, the self-propelled robot 20 first stores into a storing container 122 at the logistics base LB an article $G_1$ to be conveyed or delivered to a personal house PH, and an article $G_2$ to be conveyed or delivered to another destination of the delivery which is located near the personal house PH. At this time, for example, the self-propelled robot 20 may self-propel to a location within the logistics base LB where the articles $G_1$ and $G_2$ are disposed, and may then store the articles $G_1$ and $G_2$ into the storing container 122 by itself. At this time, for example, the self-propelled robot 20 may image an invoice pasted to the surfaces of the articles $G_1$ and $G_2$ by a camera provided thereto as image information, and may determine whether it is for either the article $G_1$ or the article $G_2$ based on the image information.

After the self-propelled robot 20 stores the articles $G_1$ and $G_2$ into the storing container 122, it is attached to the VTOL aircraft 150. Note that, although in FIG. 1 one self-propelled robot 20 is attached to the VTOL aircraft 150, a plurality of the self-propelled robots 20 may be attached to the VTOL aircraft 150 in a state where each self-propelled robot 20 stores the article to be conveyed.

The VTOL aircraft 150 moves to near the personal house PH in the state where the self-propelled robot 20 is attached thereto, and then releases the self-propelled robot 20. After being released from the VTOL aircraft 150, the self-propelled robot 20 travels by itself to the personal house PH and then releases the article $G_1$, thereby completing the conveyance or delivery of the article $G_1$ to the personal house PH. After completing the delivery of the article $G_1$, the self-propelled robot 20 travels by itself to the another destination of the delivery which is located near the personal house PH, and then releases the article $G_2$, thereby completing the delivery of the article $G_2$ to the another destination of the delivery.

The self-propelled robot 20 of which the storing container 122 becomes empty by completing the delivery of the articles $G_1$ and $G_2$ is attached to the VTOL aircraft 150 near the another destination of the delivery. The VTOL aircraft 150 moves to the logistics base LB in the state where the self-propelled robot 20 is attached thereto, and then releases the self-propelled robot 20. For example, by repeating the above-described processes, the article delivery system 10 according to this embodiment can automate the delivery process in last one mile.

(Self-Propelled Robot 20)

Figure 2A:
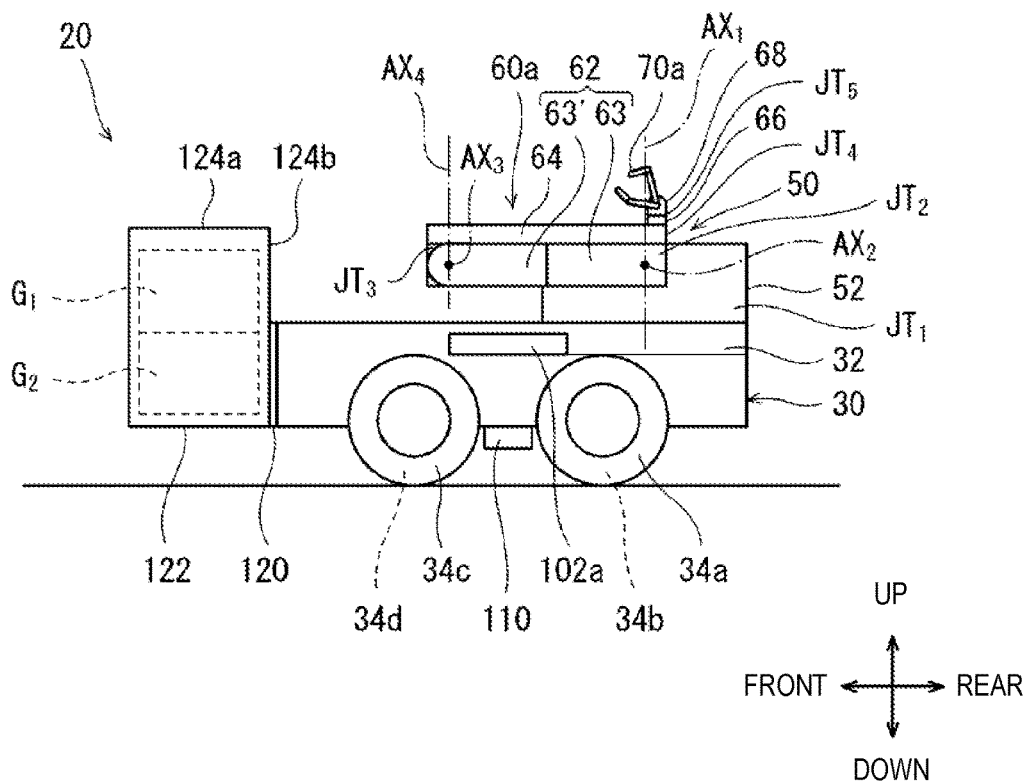
FIG. 2A is a side view illustrating a retracted state of a self-propelled robot according to this embodiment of the present disclosure.
Figure 2B:
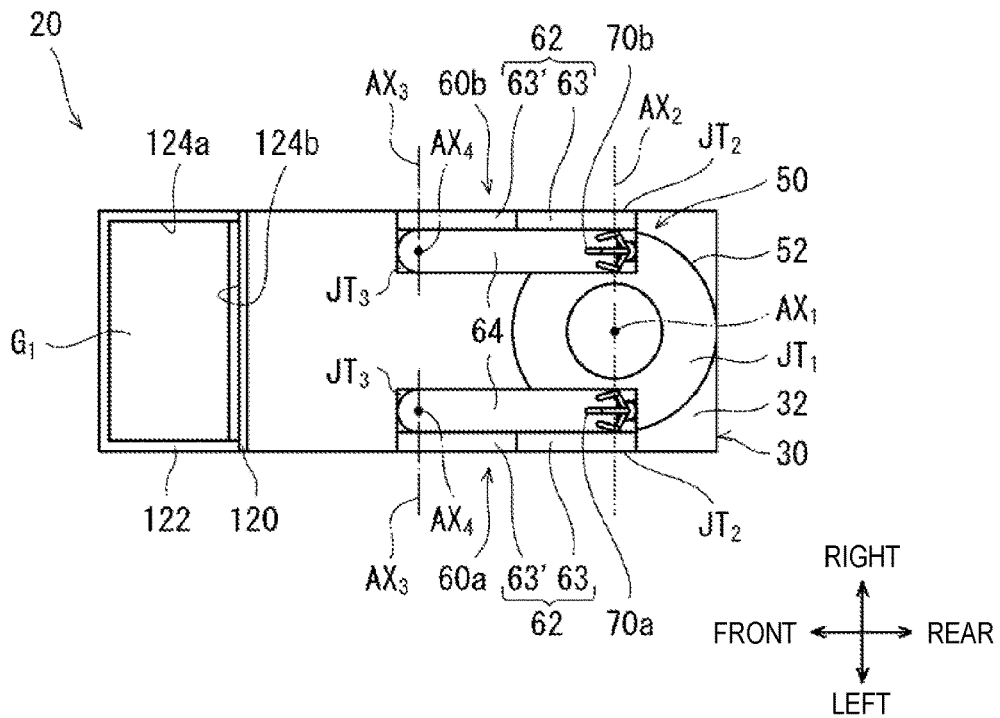
FIG. 2B is a top view illustrating the retracted state of the self-propelled robot according to this embodiment of the present disclosure.

FIG. 2A is a side view illustrating a retracted state of the self-propelled robot according to this embodiment. Further, FIG. 2B is a top view illustrating this retracted state. As illustrated in FIGS. 2A and 2B, the self-propelled robot 20 includes a travel cart 30 and a robot body 50 provided to an upper part of the travel cart 30.

(Travel Cart 30)

As illustrated in FIGS. 2A and 2B, the travel cart 30 includes a rectangular parallelepiped cart body 32 and four wheels 34a-34d attached to a bottom part of the cart body 32. The wheels 34a and 34b are attached to a rear part of the cart body 32 via one of axles, and they are rotated by a control device 90 (see FIG. 4) so that the travel cart 30 self-propels in a traveling direction. Further, the wheels 34c and 34d are attached to a front part of the cart body 32 via the other axle, and they are controlled by the control device 90 (see FIG. 4) so that the travel cart 30 changes the traveling direction.

The storing container 122 is provided to a front surface of the cart body 32 via a mounting part 120. In other words, the storing container 122 is provided in front of the travel cart 30. The storing container 122 has a hollow rectangular parallelepiped shape which is elongated in the height direction, where the articles $G_1$ and $G_2$ can be loaded and stored. An opening 124a is formed throughout an upper surface of the storing container 122. Further, a rectangular opening 124b is formed in a rear surface of the storing container 122, entirely in the width direction from an upper end edge to near a center part in the height direction. The openings 124a and 124b are formed so that they are connected at a corner part which extends in the left-and-right direction, where the upper surface and the rear surface of the storing container 122 are connected.

A lower end edge of the opening 124b is located higher than the upper surface of the cart body 32 and a bottom surface of a base part 52. Therefore, since the lower end edge of the opening 124*b* is located higher than a bottom surface of the article $G_1$ in a state where the article $G_1$ is loaded on the article $G_2$ inside the storing container 122, it can be prevented that the article $G_1$ rushes out of the rear surface of the storing container 122.

(Robot Body 50)

As illustrated in FIGS. 2A and 2B, the robot body 50 includes the base part 52 which is provided to the upper part of the travel cart 30 and is swivelable on a rotation axis $AX_1$ (first rotation axis) extending vertically, and a pair of robotic arms 60*a* and 60*b* which are coupled to the base part 52 at their base-end parts. The robot body 50 also includes robot hands 70*a* and 70*b* provided to tip ends of the pair of robotic arms 60*a* and 60*b*, respectively.

(Base Part 52)

The base part 52 is provided to a rear part of the upper surface of the cart body 32. The base part 52 has a cylindrical shape, and is provided so that its bottom surface contacts or substantially contacts the rear part of the upper surface of the cart body 32. A rear end of the base part 52 is located at the same position as the rear surface of the cart body 32 in the front-and-rear direction. Note that the rear end of the base part 52 may be located forward of the rear surface of the cart body 32. The center line of the base part 52 is located on the center line of the cart body 32 which extends in the front-and-rear direction at the center of the cart body 32 in the left-and-right direction. The base part 52 is swivelable on the rotation axis $AX_1$ (the first rotation axis) extending vertically. In other words, the robot body 50 has a joint part $JT_1$ which couples the cart body 32 to the base part 52 so as to be rotatable on the rotation axis $AX_1$.

(Pair of Robotic Arms 60*a* and 60*b*)

The pair of robotic arms 60*a* and 60*b* each have a link 62 (first link) and a link 64 (second link) which is coupled at its base-end part to a tip-end part of the link 62 via a joint part $JT_3$. In the retracted state illustrated in FIGS. 2A and 2B, the pair of robotic arms 60*a* and 60*b* extend along the center line of the self-propelled robot 20 which extends in the front-and-rear direction at the center of the self-propelled robot 20 in the left-and-right direction, and are plane-symmetry to each other with respect to a plane parallel to both side surfaces of the cart body 32. The pair of robotic arms 60*a* and 60*b* are operable independently, and operable collaboratively with each other.

The base-end parts of the pair of links 62 are coupled to the base part 52 so that they are coaxially pivotable on a rotation axis $AX_2$ (second rotation axis) extending horizontally, and so that they oppose to each other via the base part 52. In other words, the pair of robotic arms 60*a* and 60*b* each have a joint part $JT_2$ which couples the base part 52 to the link 62 so as to be rotatable on the rotation axis $AX_2$.

Figure 7:
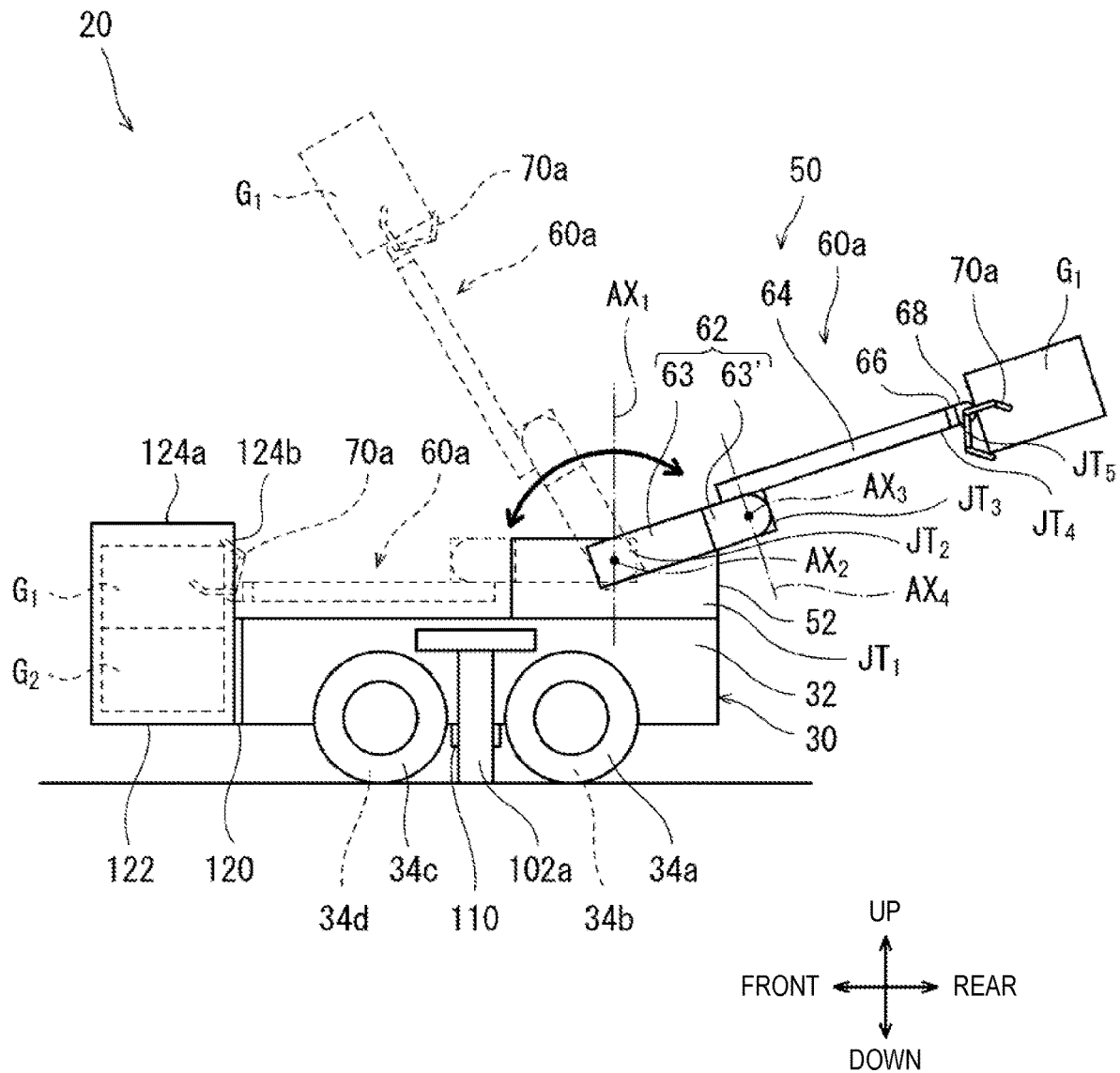
FIG. 7 is a side view illustrating a situation in which the pair of robotic arms are pivoted on a second rotation axis and convey the article in this embodiment of the present disclosure.

The pair of links 62 are each extendable and contractible in the longitudinal direction by having a base-end part 63 and a tip-end-part 63' which is extendable and contractible in a direction projecting from a tip end of the base-end part 63. Therefore, for example, as illustrated in FIG. 7 which will be illustrated later, it becomes easier to insert the pair of robot hands 70*a* and 70*b* into the storing container 122 by contracting the pair of robotic arms 60*a* and 60*b*.

Figure 3A:
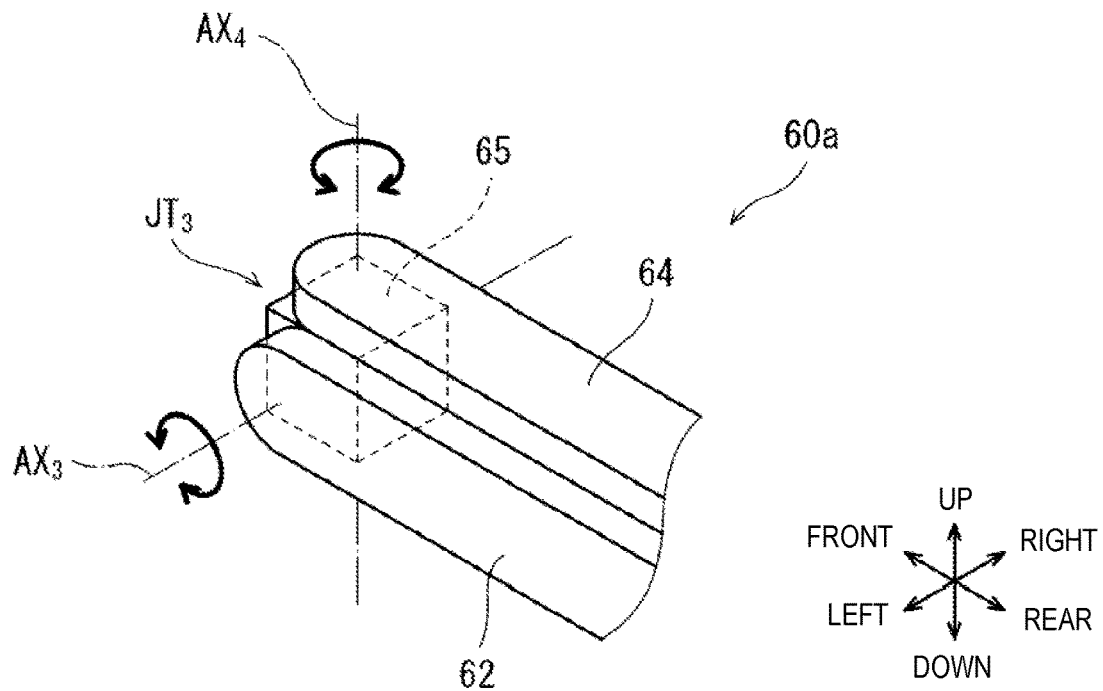
FIG. 3A is a schematic view illustrating operation of a joint part which intervenes between a first link and a second link of the self-propelled robot according to this embodiment of the present disclosure, when the robot is in the retracted state.
Figure 3B:
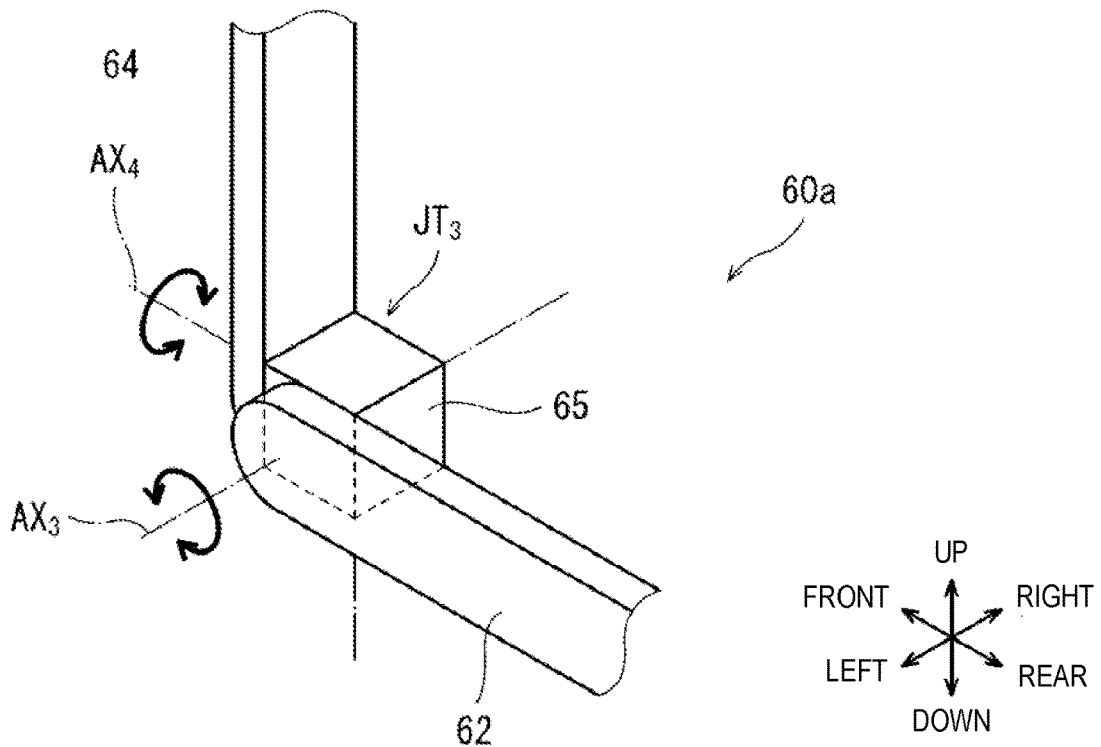
FIG. 3B is a schematic view illustrating operation of the joint part which intervenes between the first link and the second link of the self-propelled robot according to this embodiment of the present disclosure, when the robot is in an article conveying state.

FIGS. 3A and 3B are schematic views illustrating operation of the joint part which intervenes between the first link and the second link of the self-propelled robot according to this embodiment, where FIG. 3A is a view when the self-propelled robot is in the retracted state, and FIG. 3B is a view when the self-propelled robot is in an article conveying state. Here, the self-propelled robot 20 is capable of being switched between the retracted state in which the pair of robotic arms 60*a* and 60*b* are disposed above the cart body 32 of the travel cart 30 and are reduced in the size (the state illustrated in FIG. 3A), and the article conveying state for conveying the articles $G_1$ and $G_2$ by collaboratively operating the pair of robotic arms 60*a* and 60*b* (the state illustrated in FIG. 3B).

As illustrated in FIGS. 3A and 3B, the base-end parts of the pair of links 64 are each coupled to a side part of the tip-end part of the corresponding link 62, which is on the side opposing to the other link 62, via a cube-shaped coupling part 65. The tip-end parts of the pair of links 62 and the base-end parts of the pair of links 64 are each formed in a semicircular shape when seen in the corresponding thickness direction.

The joint part $JT_3$ including the coupling part 65 (i.e., the joint part $JT_3$ which intervenes between the link 62 and the link 64) can rotate the link 64 with respect to the link 62 on a rotation axis $AX_3$ (third rotation axis) extending horizontally, and on a rotation axis $AX_4$ (fourth rotation axis) perpendicular to the rotation axis $AX_3$.

In other words, by the coupling part 65 rotating on the rotation axis $AX_3$ with respect to the tip-end part of the link 62, the link 62 can rotate on the rotation axis $AX_3$ integrally with the coupling part 65. Further, by the link 64 rotating on the rotation axis $AX_4$ with respect to the coupling part 65, the link 64 can rotate on the rotation axis $AX_4$.

Note that, although in FIGS. 3A and 3B each of the pair of links 62 and the pair of links 64 has a plate shape, their shapes are not limited to such a case, but they may have other shapes, as long as the link 64 can rotate on the rotation axis $AX_3$ or $AX_4$ with respect to the link 62.

As illustrated in FIGS. 2A and 2B, each of the pair of robotic arms 60*a* and 60*b* further has a link 66 coupled at its base-end part to a tip-end part of the link 64 via a joint part $JT_4$ so as to be pivotable on a rotation axis extending horizontally. Further, each of the pair of robotic arms 60*a* and 60*b* further has a link 68 coupled at its base-end part to a tip-end part of the link 66 via a joint part $JT_5$ so as to be pivotable on the center line extending in the longitudinal direction at the center of the link 66 in the width direction.

A base end of a robot hand 70*a* is coupled to a tip end of the link 68 of the robotic arm 60*a*, and a base end of a robot hand 70*b* is coupled to a tip end of the link 68 of the robotic arm 60*b*. Note that, as illustrated in FIGS. 2A and 2B, each of the pair of robot hands 70*a* and 70*b* has three fingers, and each of the three fingers has joint part(s). Since the structure of the pair of robot hands 70*a* and 70*b* is known, detailed explanation thereof is omitted herein.

(Control Device 90)

Figure 4:
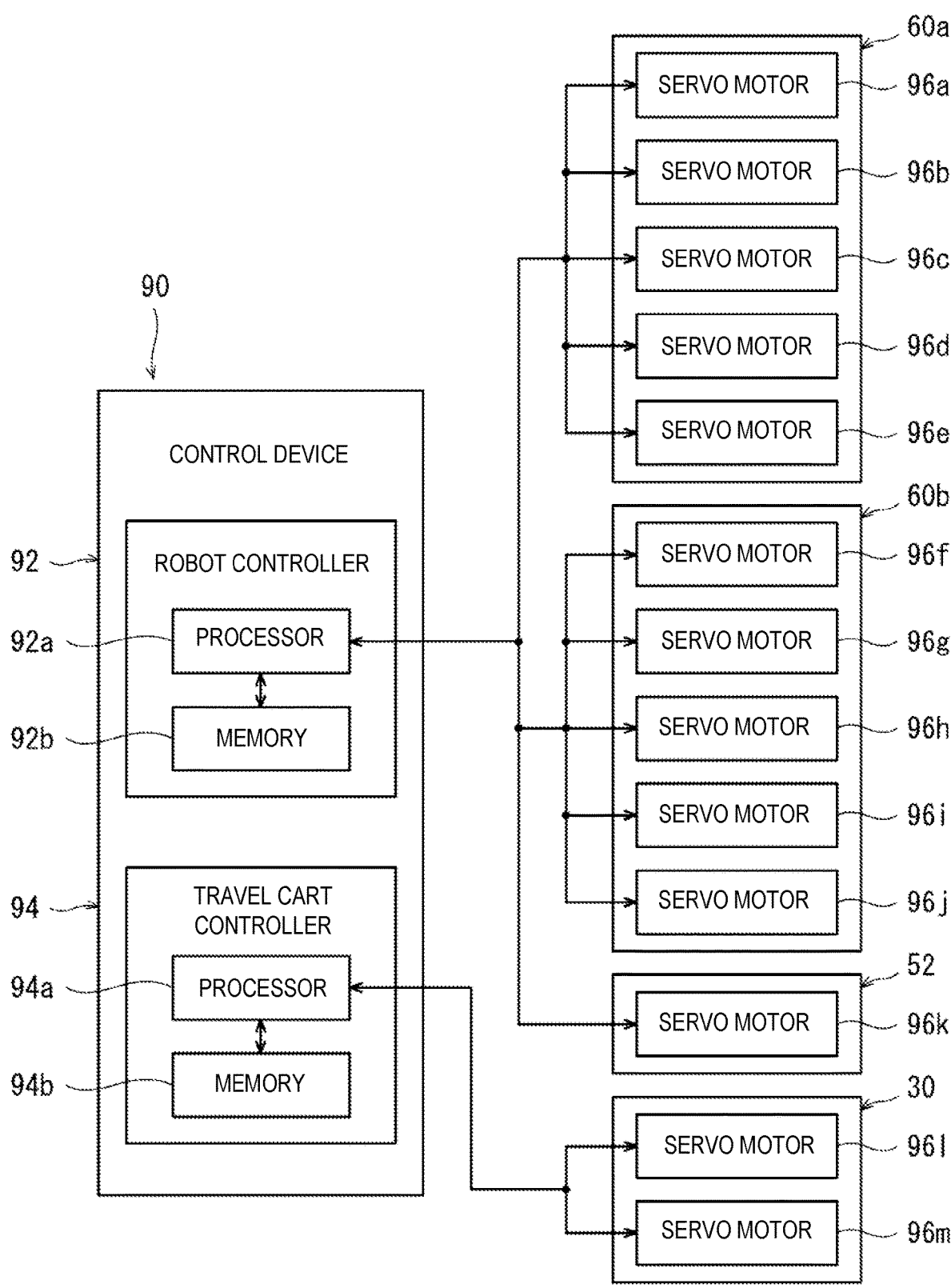
FIG. 4 is a block diagram illustrating a control system of the self-propelled robot according to this embodiment of the present disclosure.

FIG. 4 is a block diagram illustrating a control system of the self-propelled robot according to this embodiment. As illustrated in FIG. 4, the self-propelled robot 20 further includes the control device 90 for controlling operation of the travel cart 30 and the robot body 50. The control device 90 is provided inside the cart body 32. The control device 90 includes a travel cart controller 94 for controlling the operation of the travel cart 30, and a robot controller 92 for controlling the operation of the robot body 50.

The travel cart controller 94 includes a memory 94*b* for storing a program, and a processor 94*a* for executing the program stored in the memory 94*b*. The processor 94*a* of the travel cart controller 94 is connected to servo motors 96*l* and 96*m* provided to the travel cart 30.

Rotation of the wheels 34*a* and 34*b* (or rotation of the axle which couples the wheels 34*a* and 34*b*) is performed by the servo motor 96*l* provided inside the cart body 32. Operation of the wheels 34*c* and 34*d* which change the traveling direction of the travel cart 30 (or rotation of the axle which couples the wheels 34c and 34d) is performed by the servo motor 96m provided inside the cart body 32.

The robot controller 92 includes a memory 92b for storing a program, and a processor 92a for executing the program stored in the memory 92b. The processor 92a of the robot controller 92 is connected to a servo motor 96k provided to the base part 52, servo motors 96a-96e provided to the robotic arm 60a, and servo motors 96f-96j provided to the robotic arm 60b.

Swiveling of the base part 52 on the rotation axis $AX_1$ with respect to the cart body 32 is performed by the servo motor 96k provided inside the base part 52.

Rotation of the link 62 of the robotic arm 60a on the rotation axis $AX_2$ with respect to the base part 52 is performed by the servo motor 96a. Rotation of the link 64 of the robotic arm 60a on the rotation axis $AX_3$ with respect to the link 62 is performed by the servo motor 96b. Rotation of the link 64 of the robotic arm 60a on the rotation axis $AX_4$ with respect to the link 62 is performed by the servo motor 96c. Rotation of the link 66 of the robotic arm 60a with respect to the link 64 is performed by the servo motor 96d. Rotation of the link 68 of the robotic arm 60a with respect to the link 66 is performed by the servo motor 96e.

Since the robotic arm 60b operates similarly to the robotic arm 60a by the servo motors 96f-96j which correspond to the servo motors 96a-96e of the robotic arm 60a, the explanation will not be repeated herein.

Note that the pair of robot hands 70a and 70b are also provided with servo motors. The processor 92a of the robot controller 92 can control the entire operation of the robot body 50 by being connected to the servo motors provided to the pair of robot hands 70a and 70b.

Note that the self-propelled robot 20 may be operable autonomously, or may be operable remotely by an operator. For example, the self-propelled robot 20 may be released from the VTOL aircraft 150, travel autonomously to the personal house PH based on map information stored in a storage device inside the cart body 32, and then be switched to the remote control in consideration of the safety, when it delivers the article $G_1$ to a resident of the personal house PH.

(Operation Mode, and Operation and Effects of Robot Body 50)

Figure 5A:
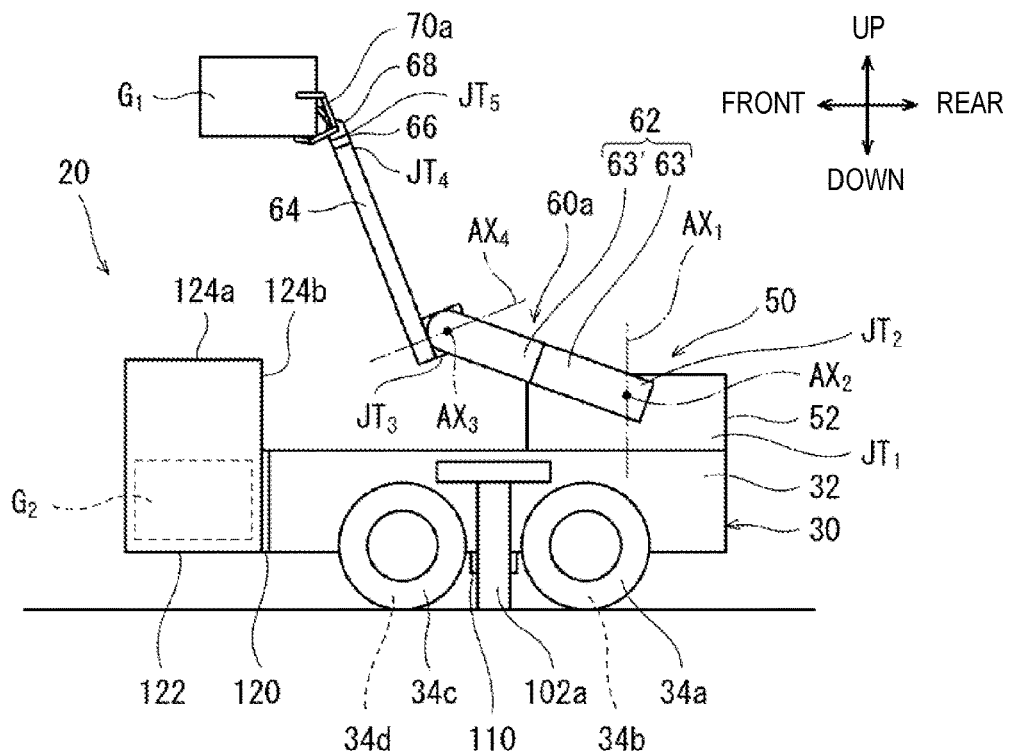
FIG. 5A is a side view illustrating a situation in which an article is held by a pair of robotic arms, while maintaining balance by outriggers, in this embodiment of the present disclosure.
Figure 5B:
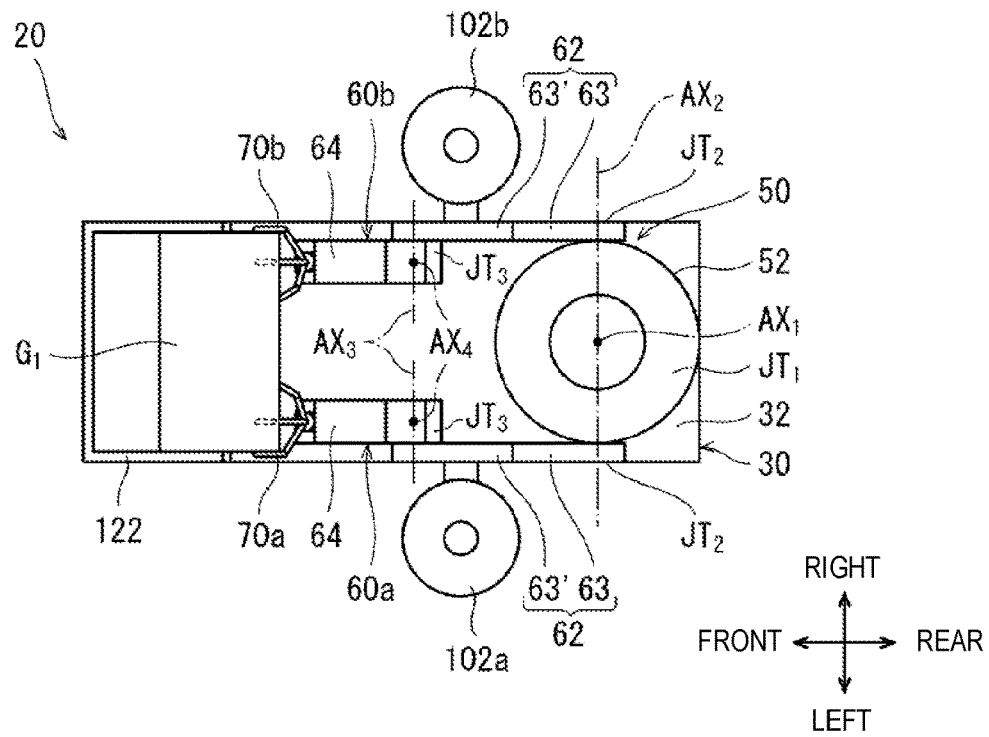
FIG. 5B is a top view illustrating a situation in which the article is held by the pair of robotic arms, while maintaining balance by the outriggers, in this embodiment of the present disclosure.

Next, mainly based on FIGS. 5A to 8, an operation mode, and operation and effects of the robot body 50 (as a result, the self-propelled robot 20) will be described. FIGS. 5A and 5B are schematic views illustrating a situation in which an article is held by the pair of robotic arms, while maintaining balance by outriggers in this embodiment, where FIG. 5A is a side view and FIG. 5B is a top view. As illustrated in FIGS. 5A and 5B, the pair of robotic arms 60a and 60b can operate collaboratively with each other to cooperatively hold and convey the article $G_1$ (and $G_2$).

As described above, the opening 124a is formed in the upper surface of the storing container 122, and the opening 124b is formed in the upper part of the rear surface. Therefore, the pair of robotic arms 60a and 60b can insert the pair of robot hands 70a and 70b into the storing container 122 through the openings 124a and 124b to take in and out the article $G_1$ (and $G_2$).

The self-propelled robot 20 further includes outriggers 102a and 102b which are provided on the both side surfaces of the cart body 32 and are deployable and retractable in a direction projecting from the cart body 32 when seen from above. The self-propelled robot 20 stores the outriggers 102a and 102b inside the cart body 32 in the retracted state described above (the state illustrated in FIGS. 2A and 2B).

Then, in the article conveying state illustrated in FIGS. 5A and 5B, the self-propelled robot 20 deploys the outriggers 102a and 102b in the projecting direction from the cart body 32 when seen from above, and then extends bar-shaped bodies, which are parts of the outriggers 102a and 102b and are extendable and contractible in the height direction, downwardly so that lower ends of the bar-shaped bodies reach the ground.

Thus, since the self-propelled robot 20 according to this embodiment can convey the articles $G_1$ and $G_2$, while maintaining balance by the outriggers 102a and 102b, it is possible to prevent shaking and rollover, when conveying the articles $G_1$ and $G_2$. Note that the outriggers 102a and 102b are not limited to the above structure. For example, the outriggers may be provided at four corners of the cart body 32 (in detail, a front end part and a rear end part of the left-hand side surface of the cart body 32, and a front end part and a rear end part of the right-hand side of the cart body 32) so that they are extendable and contractible in the directions projecting from the cart body 32 when seen from above. By having such a structure, the self-propelled robot 20 can further prevent the shaking and rollover as compared with the case illustrated in FIGS. 5A and 5B.

Figure 6:
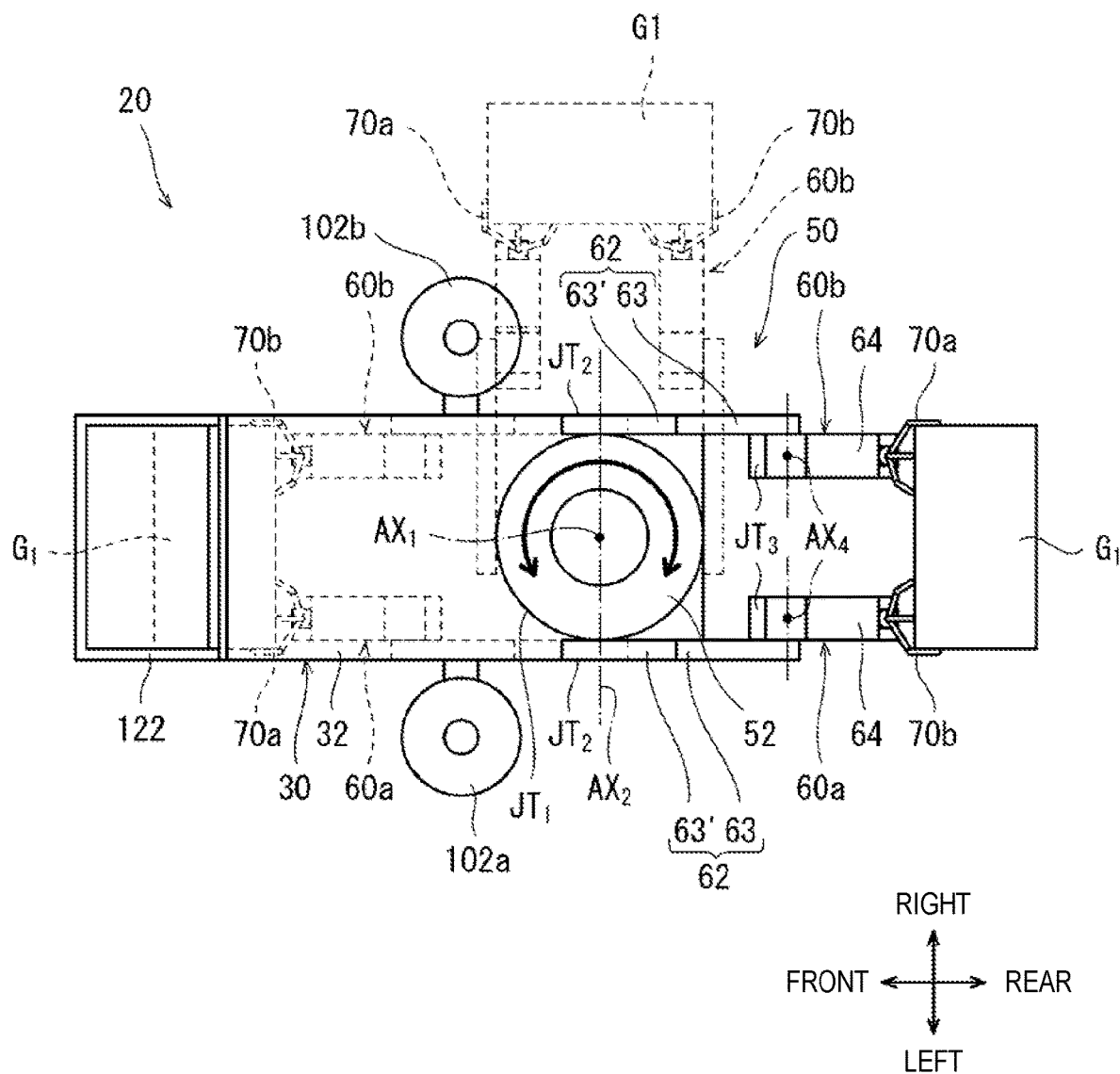
FIG. 6 is a top view illustrating a situation in which the pair of robotic arms are swiveled on a first rotation axis and convey the article in this embodiment of the present disclosure.

FIG. 6 is a top view illustrating a situation in which the pair of robotic arms are swiveled on the first rotation axis, and the article is conveyed in this embodiment. As illustrated in FIG. 6, the robot body 50 picks out the article $G_1$ from the storing container 122, and then swivels the base part 52 on the rotation axis $AX_1$, to convey the article $G_1$ from the front to the rear of the cart body 32.

FIG. 7 is a side view illustrating a situation in which the pair of robotic arms are pivoted on the second rotation axis to convey the article in this embodiment. As illustrated in FIG. 7, in the article conveying state described above, the robot body 50 is configured so that, by the pair of links 62 rotating on the rotation axis $AX_2$, the pair of robot hands 70a and 70b are movable between a position inside the storing container 122 and a position which is on the opposite side from the storing container 122 with respect to the travel cart 30, and beyond the travel cart 30.

By carrying out this operation after holding the article $G_1$ stored in the storing container 122 by the pair of robot hands 70a and 70b, the robot body 50 is capable of easily convey the article $G_1$ from the storing container 122 to a position which is located rearward of the travel cart 30, and is located beyond the travel cart 30. As a result, for example, it becomes possible to easily deliver the article $G_1$ stored in the storing container 122 to a person located behind the self-propelled robot 20.

Figure 8:
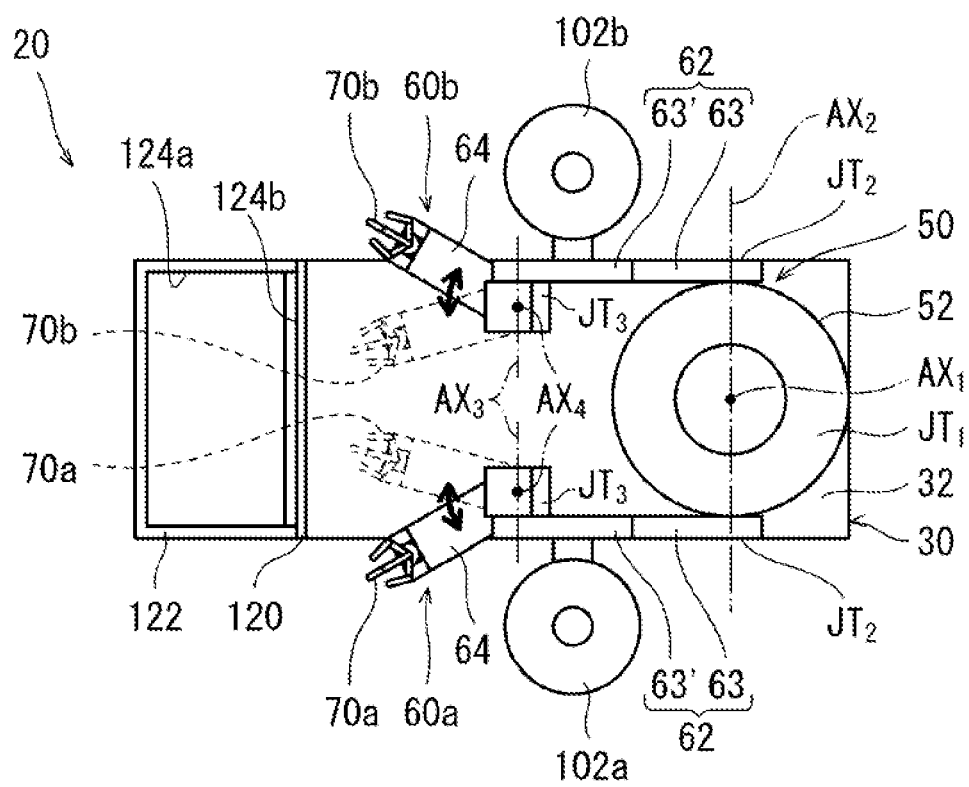
FIG. 8 is a top view illustrating a state where the self-propelled robot according to this embodiment of the present disclosure rotates the second link on a fourth rotation axis with respect to the first link.

FIG. 8 is a top view illustrating a state where the self-propelled robot according to this embodiment rotates the second link on the fourth rotation axis with respect to the first link. Here, in this embodiment, as described above, the base-end parts of the pair of links 64 are coupled to the side parts of the corresponding tip-end parts of the links 62, on the opposing sides of the pair of links 62. Thus, the self-propelled robot 20 according to this embodiment is capable of easily conveying even a small article as compared with the distance between the pair of links 62, as compared with a case where the base-end parts of the pair of links 64 are coupled to the side parts of the corresponding tip-end parts of the links 62, but on the opposite sides from the opposing sides of the pair of links 62 and at the same position in the width direction (i.e., in the left-and-right direction of the cart body 32 in the retracted state).

Further, in this embodiment, as illustrated in FIG. 8, by rotating the corresponding links 64 with respect to the pair of links 62 on the rotation axis $AX_4$, the robot body 50 can change the distance in the left-and-right direction of the pair of robot hands 70a and 70b. Therefore, even if the article is different in the width from the articles $G_1$ and $G_2$, the robot body 50 is capable of changing the distance in the left-and-right direction of the pair of robot hands 70a and 70b so as to correspond to the width of the article so that it easily conveys the article.

At this time, since the base-end parts of the pair of links 64 are coupled to the side parts of the corresponding tip-end parts of the links 62, on the opposing sides of the pair of links 62, the pair of links 64 can rotate inwardly on the rotation axis $AX_4$ without being interfered by the corresponding tip-end parts of the links 62. Therefore, even if the article is small as compared with the distance between the pair of links 62, the self-propelled robot 20 according to this embodiment can easily convey it by the pair of robotic arms 60a and 60b. Further, since the pair of links 64 can also rotate outwardly on the rotation axis $AX_4$ without being interfered by the corresponding tip-end parts of the links 62, it can easily convey the article by the pair of robotic arms 60a and 60b, even if the article is large as compared with the distance between the pair of links 62.

(Attaching Mode of Self-Propelled Robot 20 to VTOL Aircraft 150)

Figure 9A:
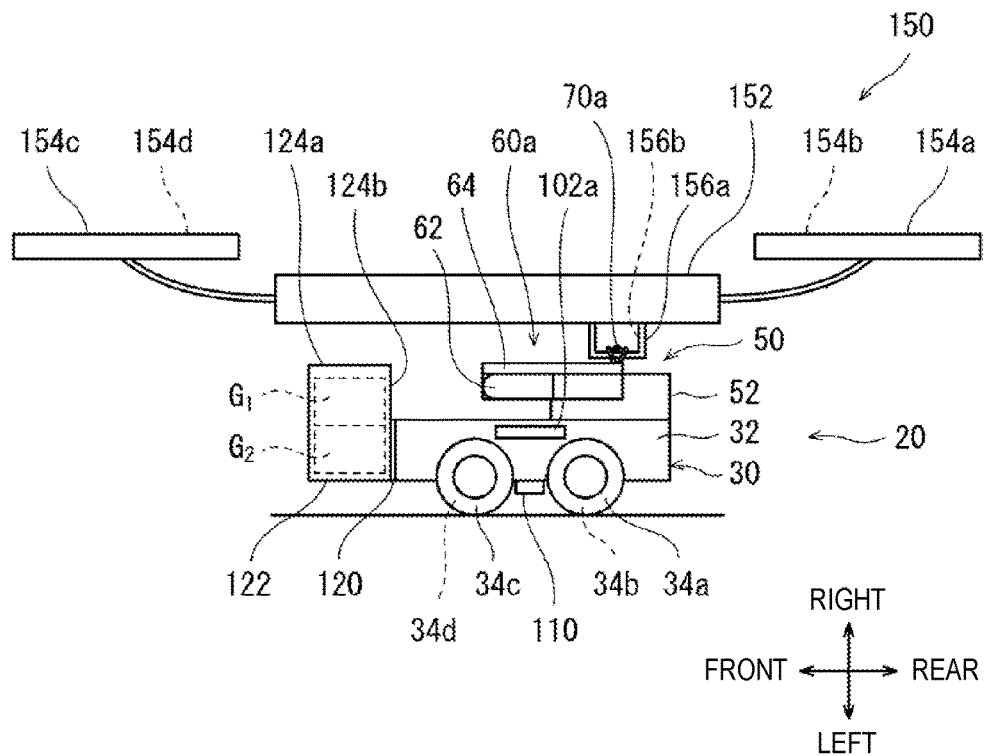
FIG. 9A is a side view illustrating a state where the self-propelled robot is converted into the retracted state when a plurality of articles are stored in a storing container, and it is attached to a VTOL aircraft, in this embodiment of the present disclosure.
Figure 9B:
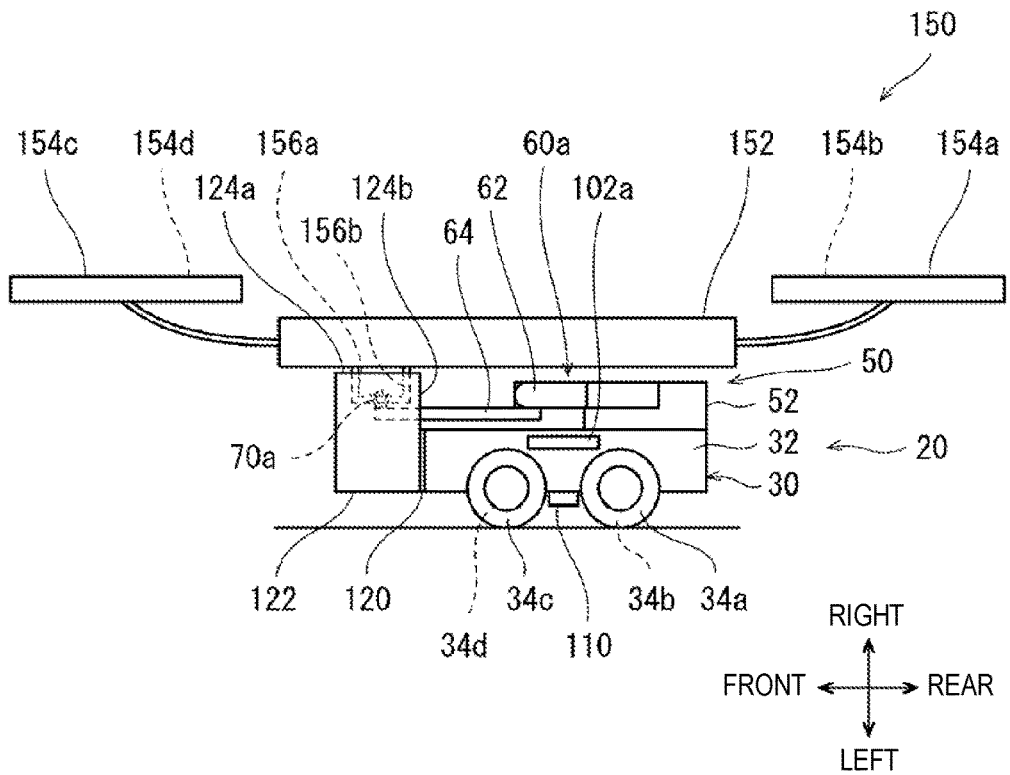
FIG. 9B is a side view illustrating a state where the self-propelled robot is converted into the retracted state when the article is not stored in the storing container, and it is attached to the VTOL aircraft, in this embodiment of the present disclosure.

FIG. 9A is a side view illustrating a state where the self-propelled robot is converted into the retracted state, and it is attached to the VTOL aircraft, when a plurality of articles are stored in the storing container, in this embodiment. FIG. 9B is a side view illustrating a state where the self-propelled robot is converted into the retracted state, and it is attached to the VTOL aircraft, when no article is stored in the storing container.

As illustrated in FIGS. 9A and 9B, the VTOL aircraft 150 includes a VTOL aircraft body 152 and four propellers 154a-154d attached to the VTOL aircraft body 152. The VTOL aircraft 150 can generate electricity, for example, by using the rotation of the propellers 154a-154d.

As illustrated in FIG. 9A, the VTOL aircraft 150 further includes a pair of handles 156a and 156b. The pair of handles 156a and 156b are provided to a bottom part of the VTOL aircraft body 152 so as to correspond to the pair of robot hands 70a and 70b of the self-propelled robot 20 which is converted into the retracted state. After the self-propelled robot 20 is converted into the above-described retracted state (the state illustrated in FIGS. 2A and 2B), it is attached underneath the VTOL aircraft 150 by the robot hand 70a grasping the handle 156a and the robot hand 70b grasping the handle 156b.

In FIG. 9A, the self-propelled robot 20 is in the state where the articles $G_1$ and $G_2$ are stored in the storing container 122. At this time, the self-propelled robot 20 becomes in the retracted state by piling the pair of links 62 and the pair of links 64 in the height direction in the side view so that the entire center of gravity of the self-propelled robot 20 and the articles $G_1$ and $G_2$ can be located at a center part of the self-propelled robot 20.

In FIG. 9B, the storing container 122 is empty. At this time, from the state illustrated in FIG. 9A, the self-propelled robot 20 rotates the corresponding links 64 on the rotation axis $AX_3$ with respect to the pair of links 62, and it is then converted into the retracted state by extending the pair of links 62 and the pair of links 64 in the front-and-rear direction so that the entire center of gravity of the self-propelled robot 20 and the articles $G_1$ and $G_2$ can be located at the center part of the self-propelled robot 20.

Note that, at this time, as illustrated in FIG. 9B, the tip ends of the pair of robotic arms 60a and 60b and the pair of robot hands 70a and 70b may be located inside the storing container 122 to cover the openings 124a and 124b. Therefore, for example, when only the article $G_2$ is stored in the storing container 122, the article $G_2$ can be prevented from rushing out of the storing container 122.

As described above, in the retracted state, by the self-propelled robot 20 according to this embodiment changing the posture of the pair of robotic arms 60a and 60b according to the weight of the article(s) stored in the storing container 122, it is possible to locate the entire center of gravity of the self-propelled robot 20 and the article(s) at the center part of the self-propelled robot 20. Therefore, the self-propelled robot 20 can be attached stably underneath the VTOL aircraft 150.

(Wireless Charging Apparatus 112)

Figure 10:
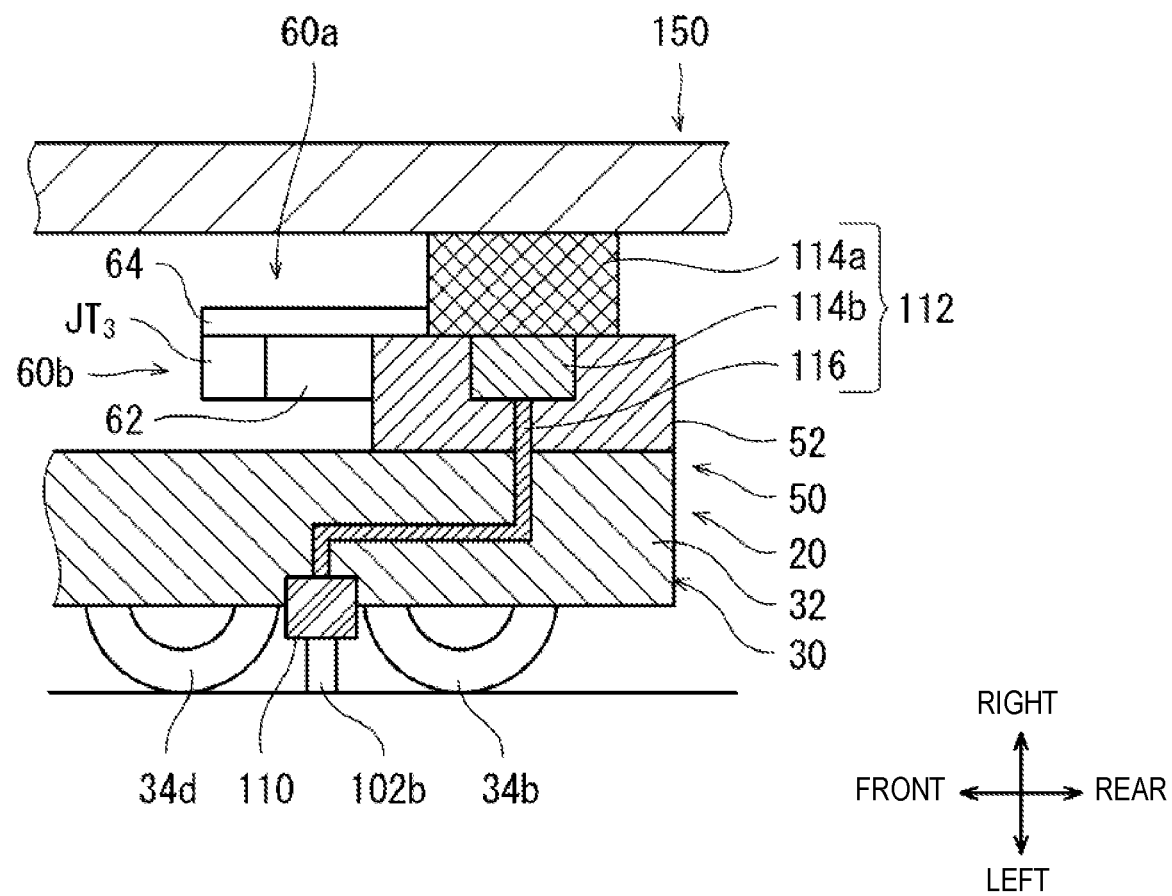
FIG. 10 is a schematic cross-sectional view illustrating a situation in which a rechargeable battery is charged by a wireless charging apparatus provided to the article delivery system according to this embodiment of the present disclosure.

FIG. 10 is a schematic cross-sectional view illustrating a situation in which a rechargeable battery is being charged by a wireless charging apparatus provided to the article delivery system according to this embodiment. As illustrated in FIG. 10, the self-propelled robot 20 further includes a rechargeable battery 110 which is provided to the bottom part of the cart body 32. The rechargeable battery 110 is provided in order to store electric power for driving the travel cart 30 and the robot body 50.

As illustrated in FIG. 10, the article delivery system 10 according to this embodiment is provided with a wireless charging apparatus 112 for charging the rechargeable battery 110. The wireless charging apparatus 112 includes a power transmitting part 114a provided to the bottom part of the VTOL aircraft body 152, and a power receiving part 114b provided to an upper part of the base part 52 of the self-propelled robot 20. The wireless charging apparatus 112 also includes an electric wire 116 for sending electric power to the rechargeable battery 110 from the power receiving part 114b.

In order to charge the rechargeable battery 110 by the wireless charging apparatus 112, first, the self-propelled robot 20 is converted into the retracted state and is then attached underneath the VTOL aircraft 150. Therefore, the power transmitting part 114a provided to the bottom part of the VTOL aircraft body 152 contacts the power receiving part 114b provided to the upper part of the base part 52. Thus, since the power receiving part 114b can be accessed from above, the rechargeable battery 110 easily becomes in the chargeable state only by attaching the self-propelled robot 20 underneath the VTOL aircraft 150. Note that, although in FIG. 10 the power transmitting part 114a contacts the power receiving part 114b, the wireless charging apparatus 112 may be structured so that it is chargeable in a state where the power transmitting part 114a does not contact the power receiving part 114b, without being limited to the above-described case.

As described above, by bringing the power transmitting part 114a provided to the VTOL aircraft body 152 into contact with the power receiving part 114b provided to the base part 52, the wireless charging apparatus 112 can send the electric power generated using the rotation of the propellers 154a-154d from the power transmitting part 114a to the power receiving part 114b, and then send it from the power receiving part 114b to the rechargeable battery 110 via the electric wire 116.

In this embodiment, for example, as described based on FIG. 1, the rechargeable battery 110 of the self-propelled robot 20 may be charged from the VTOL aircraft 150, when the VTOL aircraft 150 moves to near the personal house PH in the state where the self-propelled robot 20 is attached to the VTOL aircraft 150. Further, after the VTOL aircraft 150 moves to near the personal house PH and releases the self-propelled robot 20, power may be generated using the rotation force of the propellers 154a-154d while the VTOL aircraft 150 returns to the logistics base LB. Then, in order to convey other self-propelled robots which stand by at the logistics base LB to other delivery destinations after the VTOL aircraft 150 returns to the logistics base LB, the VTOL aircraft 150 may use the power generated when returning to the logistics base LB.

The article delivery system 10 according to this embodiment can continue performing the delivery process of the article 24/7 without resting, for example, by repeating the power generation by the VTOL aircraft 150 and the charge to the rechargeable battery 110 of the self-propelled robot 20 as described above.

Other Embodiments

Figure 11A:
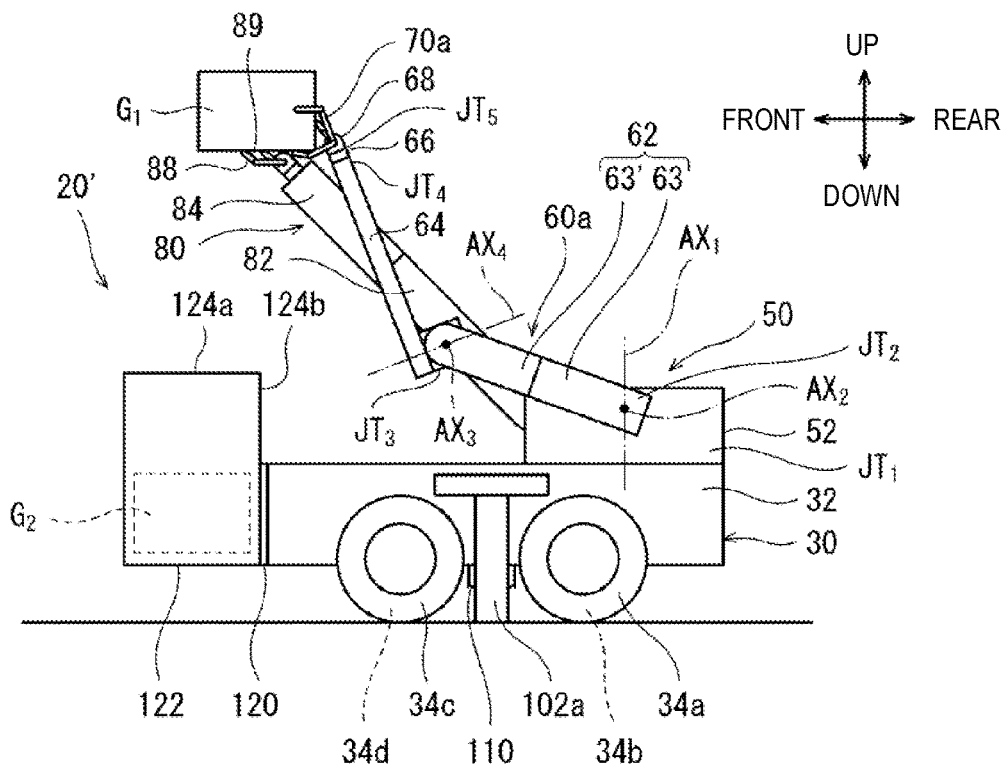
FIG. 11A is a side view illustrating a state immediately before a self-propelled robot according to another embodiment of the present disclosure delivers to a person an article held by a pair of robotic arms and an auxiliary robotic arm.
Figure 11B:
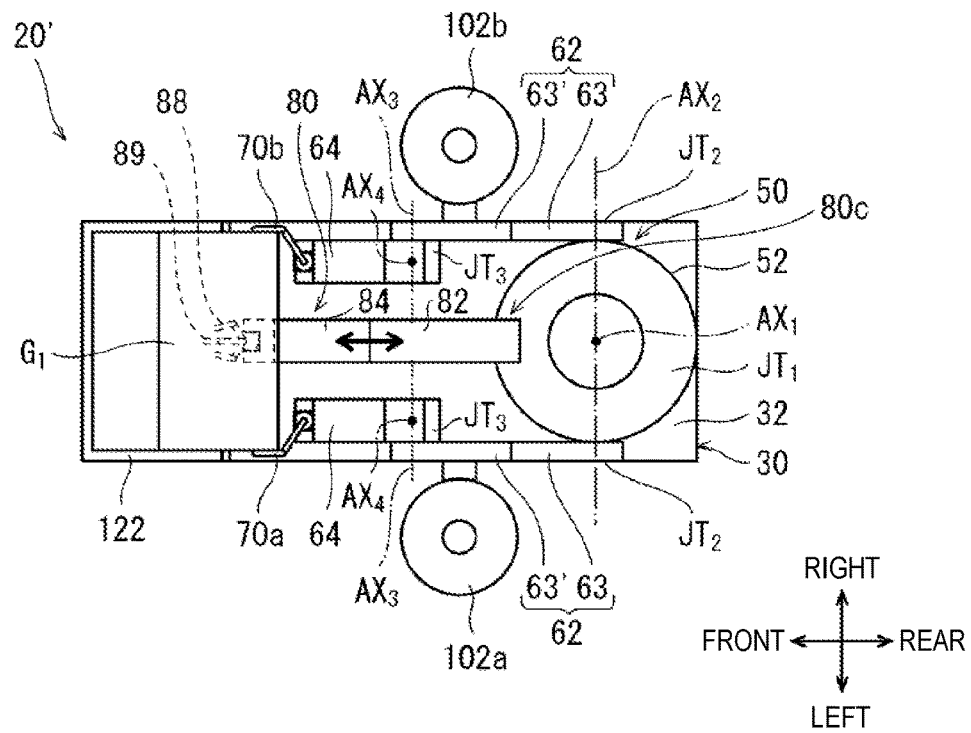
FIG. 11B is a top view illustrating the state immediately before the self-propelled robot according to the another embodiment of the present disclosure delivers to a person the article held by the pair of robotic arms and the auxiliary robotic arm.

Based on FIGS. 11A and 11B, a self-propelled robot according to another embodiment is described. FIG. 11A is a side view illustrating a state immediately before the self-propelled robot according to this embodiment delivers to a person an article held by the pair of robotic arms and an auxiliary robotic arm, and FIG. 11B is a top view of this state. Note that a self-propelled robot 20' according to this embodiment has the same structure as the self-propelled robot 20 described above, except being provided with an auxiliary robotic arm 80 and an auxiliary robot hand 88. Therefore, the same parts are denoted with the same reference characters so that similar explanation will not be repeated.

As illustrated in FIGS. 11A and 11B, the self-propelled robot 20 according to this embodiment includes the auxiliary robotic arm 80 provided between the pair of robotic arms 60a and 60b, and the auxiliary robot hand 88 provided to a tip end of the auxiliary robotic arm 80.

A base-end part of the auxiliary robotic arm 80 is coupled an upper part of the front end part of the base part 52, and is pivotable on a rotation axis which extends horizontally in the left-and-right direction of the cart body 32. The auxiliary robotic arm 80 is extendable and contractible in the longitudinal direction by having a base-end part 82 and a tip-end part 84 which is extendable and contractible in a direction projecting from a tip end of the base-end part 82.

Since the structure of the auxiliary robot hand 88 is known similarly to the pair of robot hands 70a and 70b described above, the detailed explanation is omitted herein. The auxiliary robot hand 88 assists in holding of the article $G_1$ by the pair of robot hands 70a and 70b by supporting the article $G_1$ from below. At this time, for example, it is possible to smoothly deliver the article $G_1$ from the self-propelled robot 20 to a person by providing a sensor 89 for detecting the weight of the article $G_1$ to the auxiliary robot hand 88.

For example, after the pair of robotic arms 60a and 60b and the pair of robot hands 70a and 70b convey the article $G_1$ to a position from which the article $G_1$ can be handed over to a person, the person then receives the article $G_1$ in a state where the auxiliary robotic arm 80 is extended and the auxiliary robot hand 88 supports the article $G_1$ from below. At this time, it becomes possible to smoothly deliver the article $G_1$ from the self-propelled robot 20 to the person by reducing a force for holding the article $G_1$ by the pair of robot hands 70a and 70b based on a detection value of the sensor 89 provided to the auxiliary robot hand 88.

(Modifications)

It is apparent for the person skilled in the art that many improvements and other embodiments of the present disclosure are possible from the above description. Therefore, the above description is to be interpreted only as illustration, and it is provided in order to teach the person skilled in the art the best mode to implement the present disclosure. The details of the structures and/or the functions of the present disclosure may be changed substantially, without departing from the spirit of the present disclosure.

In the above embodiment, the base-end parts of the pair of links 64 are coupled, by the cube-shaped coupling parts 65, to the side parts of the corresponding tip-end parts of the links 62, on the opposing sides of the pair of links 62. However, without being limited to this case, other structures may be adopted, as long as they are capable of rotating the pair of links 64 on the rotation axes $AX_3$ and $AX_4$ with respect to the corresponding links 62.

In the above embodiment, the storing container 122 is provided in front of the travel cart 30. However, without being limited to this case, the storing container 122 may be provided behind the travel cart 30. In such a case, for example, the base part 52 may be provided in a front part of the travel cart 30. Alternatively, the storing container 122 may be provided to parts other than the front and the rear of the travel cart 30 (for example, the upper surface of the travel cart 30).

In the above embodiment, the travel cart 30 has the four wheels 34a-34d. However, without being limited to the case, the travel cart 30 may have a known structure which allows the cart to climb up and down stairs. As such a structure, the travel cart 30 may be provided with a crawler, for example.

In the above embodiment, each of the pair of links 62 and the pair of links 64 has a plate shape. However, without being limited to such a case, each of the pair of links 62 and the pair of links 64 may have a cylindrical shape, or other shapes.

In the above embodiment, each of the pair of links 62 is extendable and contractible in the longitudinal direction. However, without being limited to this case, the pair of links 64 may be extendable and contractible in the longitudinal direction, instead of the pair of links 62, or each of the pair of links 62 and the pair of links 64 may be extendable and contractible in the longitudinal direction. Alternatively, each of the pair of links 62 and the pair of links 64 may have a fixed-length structure. Therefore, the structure of the robot body 50 can be simplified.

In the above embodiment, the article delivery system 10 is provided with the VTOL aircraft 150 as illustrated in FIGS. 1, 9A, and 9B, as the unmanned aerial vehicle. However, without being limited to this case, the article delivery system 10 may be provided with other unmanned aerial vehicles. Note that the detailed explanation of other unmanned aerial vehicles is omitted herein since the structures are known.

In the above embodiment, the self-propelled robot 20 is attached underneath the VTOL aircraft 150 by the pair of robot hands 70a and 70b grasping the pair of handles provided to the VTOL aircraft 150. However, without being limited to this case, for example, base ends of a plurality of wire ropes may be attached to the bottom surface of the VTOL aircraft body 152, and the self-propelled robot 20 may be attached to tip ends of the plurality of wire ropes, in order to attach the self-propelled robot 20 underneath the VTOL aircraft 150. Alternatively, a VTOL aircraft 150 larger in size, as compared with the VTOL aircraft illustrated in FIGS. 1, 9A, and 9B, may be provided, and the self-propelled robot 20 may be stored inside the VTOL aircraft 150.

In the above embodiment, the rechargeable battery 110 stores the electric power for driving the travel cart 30 and the robot body 50. However, without being limited to this case, the rechargeable battery 110 may be provided to store electric power for driving at least one of the travel cart 30, the base part 52, and the pair of robotic arms 60a and 60b. Moreover, for example, in addition to provide the rechargeable battery 110 to the travel cart 30, other electric power sources may be provided to the travel cart 30 or the robot body 50.

In the above embodiment, the destination of the delivery of the article $G_1$ is the personal house PH. However, without being limited to this case, the destination of the delivery of the article may be an apartment, an office, and other structures or constructions.

SUMMARY

In order to solve the above-described problem, the self-propelled robot according to one embodiment of the present disclosure includes the travel cart, the base part provided to the upper part of the travel cart and swivelable on the first rotation axis extending vertically, and the pair of robotic arms coupled to the base part at the base-end parts, respectively. Each of the pair of robotic arms has the first link and the second link coupled at the base-end part to the tip-end part of the first link via the joint part. The base-end parts of the pair of first links are coupled to the base part so that the base-end parts are coaxially pivotable on the second rotation axis extending horizontally, and the base-end parts oppose to each other via the base part. The base-end parts of the pair of second links are coupled to the side parts of the tip-end parts of the corresponding first links, on the opposing sides of the pair of first links.

According to this configuration, the base-end parts of the pair of second links are coupled to the side parts of the tip-end parts of the corresponding first links, on the opposing sides of the pair of first links. Therefore, it is possible to easily convey an article, even if the article is small as compared with the distance between the first links of the pair of robotic arms provided to the most base-end side.

The joint part intervening between the first link and the second link may rotate the second link with respect to the first link on the third rotation axis extending horizontally, and rotate the second link with respect to the first link on the fourth rotation axis perpendicular to the third rotation axis.

According to this configuration, by rotating the corresponding second links with respect to the pair of first links on the fourth rotation axis, the self-propelled robot can change the distance between the tip ends of the pair of robotic arms in the left-and-right direction of the travel cart. Therefore, even when conveying a plurality of articles which are different in the width from each other, the self-propelled robot is capable of changing the distance between the tip ends of the pair of robotic arms so as to correspond to the width of each of the plurality of articles so that it easily conveys the plurality of articles.

The pair of robotic arms may collaboratively convey an article, and the self-propelled robot may further include the storing container which is provided to the travel cart and stores the article. The opening may be formed in at least the upper part of the storing container.

According to this configuration, the tip ends of the pair of robotic arms can be easily inserted into the storing container through the opening formed in the upper part thereof. Therefore, it is possible to easily take the article in and out of the storing container.

The self-propelled robot may further include robot hands provided to tip ends of the pair of robotic arms, respectively. The storing container may be provided in front of or behind the travel cart. By the pair of first links rotating on the second rotation axis, the pair of robot hands may be movable between the position inside the storing container, and the position located on the opposite side from the storing container with respect to the travel cart and located beyond the travel cart.

According to this configuration, it is possible to easily convey the article stored in the storing container from the storing container to the position which is located on the opposite side of the travel cart and located beyond the travel cart. As a result, for example, it becomes possible to easily deliver the article stored in the storing container to a person located on the opposite side of the self-propelled robot.

The self-propelled robot may switch between the article conveying state in which the pair of robotic arms collaboratively convey the article, and the retracted state in which the pair of robotic arms are located on the travel cart to reduce the size of the self-propelled robot. By changing the posture of the pair of robotic arms in the retracted state according to the weight of the article stored in the storing container, the entire center of gravity of the self-propelled robot and the article may be located in the center part of the self-propelled robot.

According to this configuration, it is possible to prevent shaking and rollover of the self-propelled robot, regardless of the weight of the article stored in the storing container. Further, for example, it is possible to stably attach the self-propelled robot underneath the unmanned conveying vehicle.

The self-propelled robot may further include outriggers provided to the travel cart and extendable and contractible in a direction projecting from the travel cart when seen from above.

According to this configuration, since the article can be conveyed while the balance is maintained by the outriggers, it is possible to prevent the shaking and rollover when conveying the article.

The self-propelled robot may further include the rechargeable battery which stores electric power for driving at least one of the travel cart, the base part, and the pair of robotic arms, and the receiving part of the wireless charging apparatus which charges the rechargeable battery, the receiving part being provided to the upper part of the base part.

According to this configuration, by accessing the power receiving part of the wireless charging apparatus from above, the rechargeable battery of the self-propelled robot can be easily charged. Further, for example, by providing the power transmitting part of the wireless charging apparatus underneath the unmanned conveying vehicle, it becomes possible to bring into contact or bring closer the power receiving part and the power transmitting part of the wireless charging apparatus to create a state where the rechargeable battery can be charged, by only attaching the self-propelled robot underneath the unmanned conveying vehicle.

In order to solve the above-described problem, the article delivery system according to one embodiment of the present disclosure includes the self-propelled robot of any one of the above-described configurations, and the unmanned aerial vehicle which attaches the self-propelled robot underneath thereof, or stores the self-propelled robot therein.

According to this configuration, it becomes possible to convey the self-propelled robot to near the destination of the delivery by the unmanned aerial vehicle. Therefore, for example, it becomes possible to automate the delivery process in the last section from the logistics base to the destination of the delivery.

The invention claimed is:

1. A self-propelled robot, comprising:
a travel cart;
a base part provided to an upper part of the travel cart and swivelable on a first rotation axis extending vertically; and
a pair of robotic arms coupled to the base part at base-end parts, respectively,
wherein each of the pair of robotic arms has a first link and a second link coupled at a base-end part to a tip-end part of the first link via a joint part, wherein
base-end parts of the pair of first links are coupled to the base part so that the base-end parts are coaxially pivotable on a second rotation axis extending horizontally, and the base-end parts oppose to each other via the base part,
the base-end parts of the pair of second links are coupled to side parts of the tip-end parts of the corresponding first links on opposing sides of the pair of first links,
the pair of robotic arms are configured to collaboratively convey an article,
the self-propelled robot further comprises a storing container provided to the travel cart and configured to store the article,
an opening is formed in at least an upper part of the storing container,
the self-propelled robot is configured to switch between an article conveying state in which the pair of robotic arms collaboratively convey the article, and a retracted state in which the pair of robotic arms are located on the travel cart to reduce the size of the self-propelled robot, and
the entire center of gravity of the self-propelled robot and the article is located in a center part of the self-propelled robot by changing a posture of the pair of robotic arms in the retracted state according to a weight of the article stored in the storing container.

2. The self-propelled robot of claim 1, wherein the joint part intervening between the first link and the second link rotates the second link with respect to the first link on a third rotation axis extending horizontally, and rotates the second link with respect to the first link on a fourth rotation axis perpendicular to the third rotation axis.

3. The self-propelled robot of claim 1, further comprising robot hands provided to tip ends of the pair of robotic arms, respectively,
wherein the storing container is provided in front of or behind the travel cart, and
wherein, by the pair of first links rotating on the second rotation axis, the pair of robot hands are movable between a position inside the storing container, and a position located on the opposite side from the storing container with respect to the travel cart and located beyond the travel cart.

4. The self-propelled robot of claim 1, further comprising outriggers provided to the travel cart and configured to be extendable and contractible in a direction projecting from the travel cart when seen from above.

5. The self-propelled robot of claim 1, further comprising:
a rechargeable battery configured to store electric power for driving at least one of the travel cart, the base part, and the pair of robotic arms; and
a receiving part of a wireless charging apparatus configured to charge the rechargeable battery, the receiving part being provided to an upper part of the base part.

6. An article delivery system, comprising:
a self-propelled robot, comprising:
a travel cart;
a base part provided to an upper part of the travel cart and swivelable on a first rotation axis extending vertically; and
a pair of robotic arms coupled to the base part at base-end parts, respectively,
wherein each of the pair of robotic arms has a first link and a second link coupled at a base-end part to a tip-end part of the first link via a joint part, wherein
base-end parts of the pair of first links are coupled to the base part so that the base-end parts are coaxially pivotable on a second rotation axis extending horizontally, and the base-end parts oppose to each other via the base part, and
the base-end parts of the pair of second links are coupled to side parts of the tip-end parts of the corresponding first links on opposing sides of the pair of first links; and
an unmanned aerial vehicle configured to attach the self-propelled robot underneath thereof, or store the self-propelled robot therein.

* * * * *